United States Patent

[11] 3,596,895

[72] Inventor Arthur B. Hirtreiter
 Akron, Ohio
[21] Appl. No. 815,556
[22] Filed Apr. 14, 1969
[45] Patented Aug. 3, 1971
[73] Assignee The Goodyear Tire & Rubber Company
 Akron, Ohio

[54] PROTECTIVE MEMBER
 23 Claims, 7 Drawing Figs.
[52] U.S. Cl. .................................................. 267/65
[51] Int. Cl. .................................................. F16f 9/04
[50] Field of Search ...................................... 267/65, 65 A

[56] References Cited
UNITED STATES PATENTS
2,443,433  6/1948  Sanmori .................... 267/65 (A)
3,140,880  7/1964  Masser ...................... 267/65 (A)

Primary Examiner—James B. Marbert
Attorneys—F. W. Brunner and Ronald P. Yaist

ABSTRACT: A protective member of flexible resilient material which is retained on the surface of a member of a fluid spring assembly to prevent the substantial accumulation of harmful abrading debris which may damage the flexible resilient spring member during the operation of the spring assembly. The protective member is particularly useful in a vehicle suspension system.

Patented Aug. 3, 1971  3,596,895
3 Sheets-Sheet 1
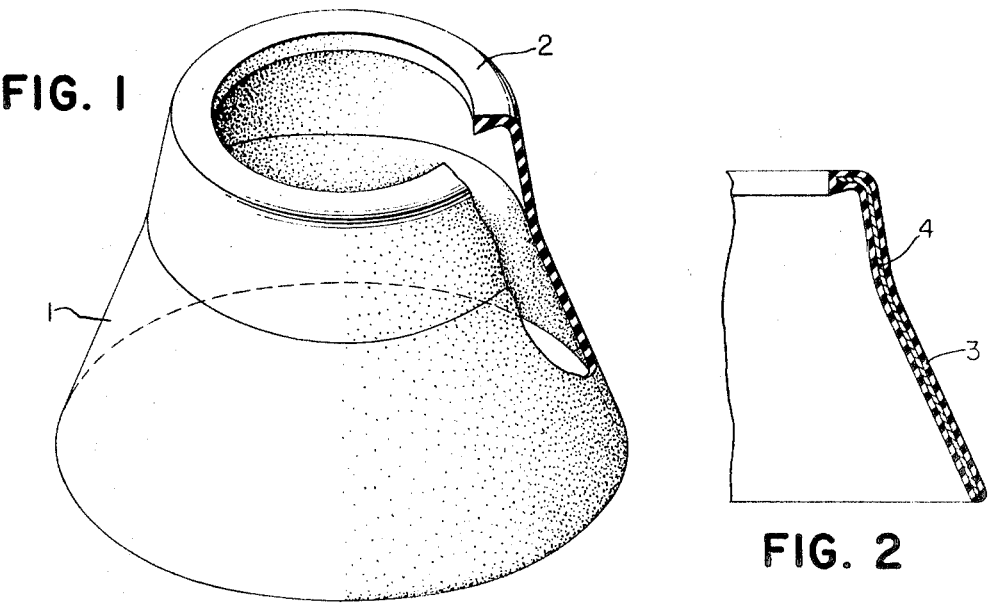
FIG. 1
FIG. 2
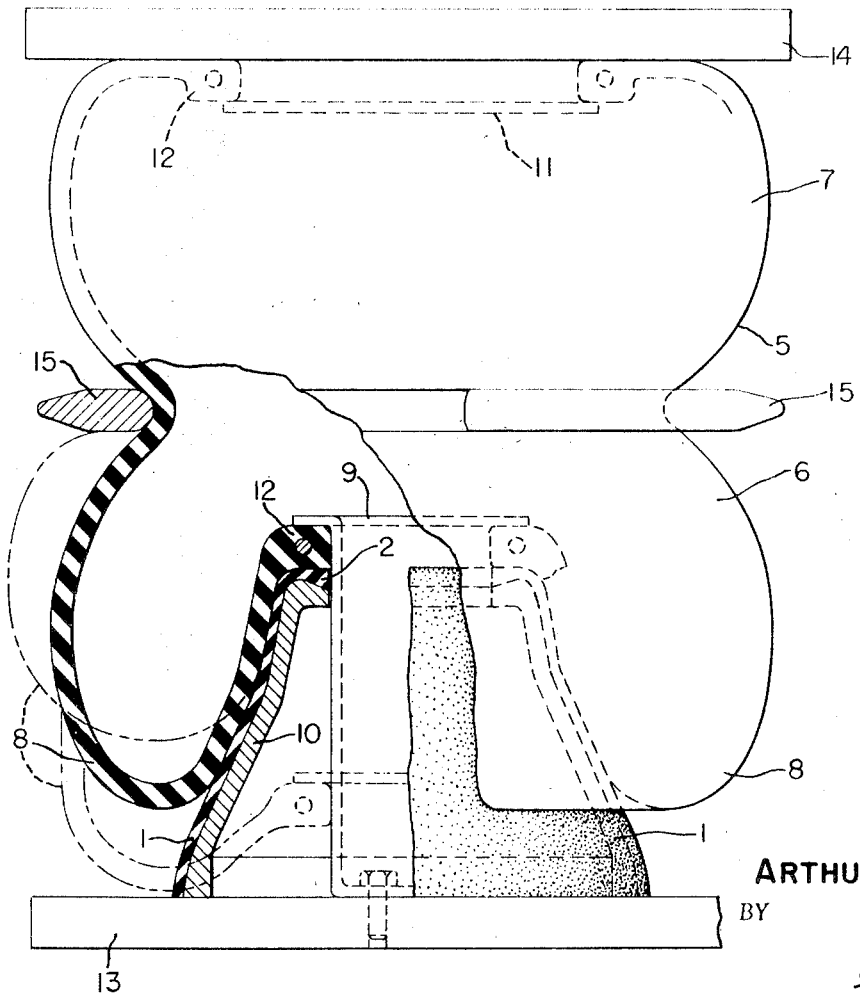
FIG. 3
INVENTOR.
ARTHUR B. HIRTREITER
BY
*R P Yaist*
ATTORNEY Patented Aug. 3, 1971

INVENTOR.
ARTHUR B. HIRTREITER

BY

*R P Yaist*

ATTORNEY

Patented Aug. 3, 1971

INVENTOR.
ARTHUR B. HIRTREITER

BY

*R P Yaist*
ATTORNEY

PROTECTIVE MEMBER

BACKGROUND OF THE INVENTION

This invention relates to fluid springs, such as pneumatic or air springs of the type used in fluid suspension systems. More specifically, this invention relates to fluid springs of the type in which a piston member moves within the flexible resilient member of the spring to cause the compression and expansion of the confined fluid. This invention has particular application to a means for preventing the accumulation of harmful abrading debris on the surface of the piston member which may damage the flexible resilient spring member during the operation of the spring.

Pneumatic or air springs are normally employed for shock absorbing, load supporting, and vibration isolation in vehicle suspension systems and other industrial and military applications. In the typical fluid pressure system a flexible resilient spring member having a hollow body of fabric-reinforced elastomeric material, such as rubber or the like, is positioned between and attached to retaining elements to form a fluid tight chamber capable of supporting a load. Customarily, an essentially inextensible bead containing a circumferential retaining wire or bead ring is formed at each of the peripheral ends of the member to create a compression seal on the retaining elements. The retaining elements are adapted for movement relative to each other to cause the configuration of the spring member to change with such movement, thereby resulting in a change of the pressure of the fluid contained in the chamber. This compression and expansion of the column of fluid contained in the chamber occurs during what is known as the deflection cycle of the spring which includes the compression and extension or rebound strokes.

In the so-called piston-type spring, at least one of the retaining elements is a generally cylindrical piston usually made of metal which is employed to cause the compression and expansion of the fluid contained in the spring. In the operation of this type spring, when the piston moves within the spring member the piston and the retaining element attached to the other end of the spring member move relative to one another and a rolling motion is created in the toroidal loop portions of the wall of the spring member with the resulting change of configuration of the spring member consequently changing the pressure of the fluid contained in the chamber. An excellent detailed description of the construction, operation, and production of the rolling lobe-type air spring, which is one of the more common piston-type springs, is contained in Hirtreiter U. S. Pat No. 3,043,582.

Those skilled in the art are aware that a particularly acute problem encountered during the operation of the piston type spring, for instance, in a vehicle suspension system, is the entrapment of debris, such as road dust, tar, oil, or other foreign matter which migrates along the outer surface of the piston during the operation of the fluid spring and becomes lodged between the outer surface of the wall of the spring member and the outer surface of the piston. Furthermore, the problem is aggravated if the foreign matter becomes dispersed in the tar and oil which act as a binder causing the debris to stick to the surface of the piston and eventually harden. During the ensuing movement of the flexible spring member the accumulation of this debris eventually abrades the walls of the spring member and causes premature failure.

This problem is eliminated or significantly reduced by the present invention in which a protective member of flexible resilient material is superposed over and made to snugly fit at least a portion of the outer surface of the piston member. The protective member is retained on the piston member in such a manner that when the piston moves within the spring member and causes the rolling motion therein the resulting movement of the spring member over the protective member causes a slight flexing in the protective member which deflects and/or flakes off harmful abrading debris from the surface of the piston member to eliminate any substantial accumulation of such debris. The protective member also provides a barrier which prevents the migration of the debris along the outer surface of the piston during the operation of the spring.

Preferably, the protective member covers substantially the entire outer peripheral surface of the piston to most effectively prevent the accumulation and migration of the foreign matter. However, it may also cover only the outer peripheral surface of the end portion of the piston that moves within the spring member or be positioned so as to cover only a portion of the outer peripheral surface in the central portion of the piston.

As will become apparent, the protective members of this invention may be of various sizes, shapes, and constructions, may be manufactured from a variety of materials, and may be utilized in more than one type pneumatic pressure system.

OBJECTS OF THE INVENTION

It is the principal object of this invention to increase the operating life of a fluid spring in a fluid pressure system by substantially reducing the accumulation of abrading debris on the outer peripheral surface of the piston member of the fluid spring assembly.

It is another important object of this invention to provide in a vehicle suspension system a pneumatic spring including a protective member to fit over at least a portion of the outer peripheral surface of the piston member of the spring and be retained thereon in such a manner that when the piston member travels within the flexible spring member the resulting movement of the spring member over the protective member causes a slight flexing in the protective member which deflects and/or flakes off harmful abrading debris from the surface of the piston member and prevents the migration of such debris along the outer surface thereof.

Other objects and advantages of this invention will become apparent hereinafter as the description thereof proceeds, the novel features, arrangements and combinations being clearly pointed out in the specification as well as the claims thereunto appended.

BRIEF DESCRIPTION OF THE DRAWINGS

In the drawings:

FIG. 1 is a perspective view of the protective member of this invention;

FIG. 2 is an enlarged fragmentary sectional view of a modification of the invention shown in FIG. 1;

FIG. 3 is an elevational view shown partly in section of a typical fluid spring assembly utilizing the protective member of FIG. 1;

DESCRIPTION OF THE PREFERRED EMBODIMENTS

In FIG. 1, one embodiment of the protective member 1 is shown before installation in a fluid suspension system. The protective member 1 is generally cap-shaped, preferably assuming the contour of the piston member which it is to cover and includes a peripheral holding lip 2 at one end to provide means for retention on the piston. The member 1 is formed in the desired configuration from a flexible resilient material in any one of a number of manners well known in the art, such as by spraying, dipping, centrifugal casting, injection molding, compression molding, or possibly by vacuum forming. Many of the common formable polymeric materials are suitable for this purpose as will be hereinafter discussed.

The protective member of this invention may also contain textile fabric reinforcement. This is shown in FIG. 2 in which the member 3 contains reinforcement 4 which may be in the form of cord or square woven fabric laid on a bias, knit fabric, or even short lengths of filamentary material dispersed in the flexible material of the member.

Figure 4:
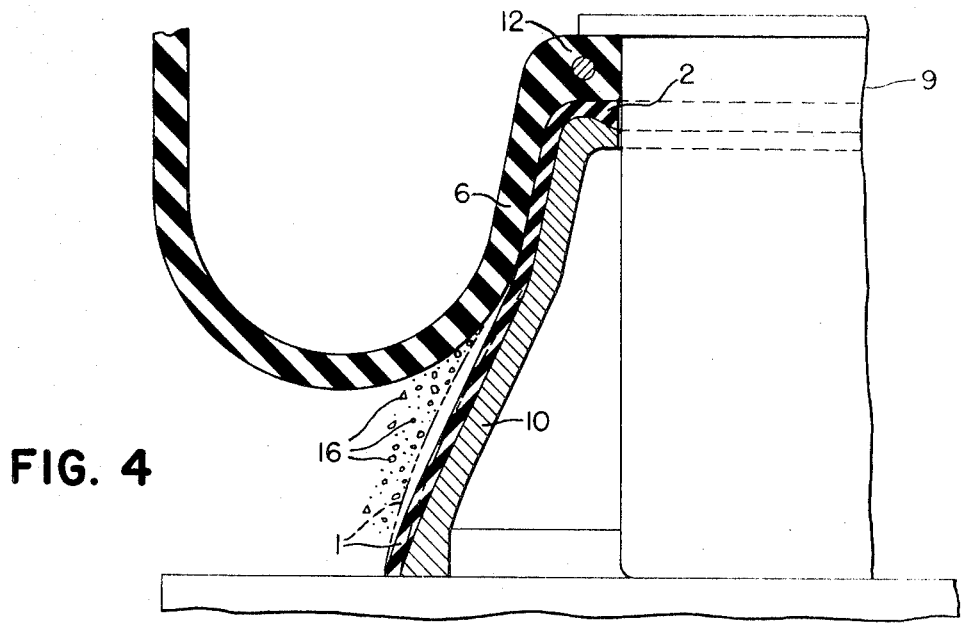
FIG. 4 is an enlarged fragmentary view more clearly indicating the invention shown in FIG. 3.

FIGS. 3 and 4 shown a typical application for the protective member 1 in a fluid pressure system, which in this instance is a combination bellows and piston-type spring assembly 5 which, for instance, is used in a vehicle suspension system. The spring 5 is shown under load in a normal or design position. As illustrated, the spring assembly 5 includes a flexible resilient spring member 6 having a hollow body of fabric-reinforced elastomeric material, such as rubber or the like. The upper portion of the spring member 6 is in the form of a bellows lobe 7 of generally toroidal-shape and the lower portion is in the form of the typical rolling lobe tubular sleeve or toroidal loop 8. The spring member 6 is installed in the system in the customary manner by having one of its peripheral ends attached to a relatively rigid metal piston assembly 9 which serves as a lower retaining element and includes a generally cylindrical modified bell-shaped piston 10 and the other peripheral end attached to an upper retaining element 11 spaced from the piston assembly 9. The spring member includes beads 12 at each peripheral end which in conjunction with the customary clamp elements of the piston assembly 9 create a compression seal on the retaining elements 9 and 11 so that a pressure retaining chamber is formed. The piston assembly 9 is secured to a bottom end plate 13 which, for example, may be the axle pad of a vehicle. Similarly, the upper retaining element 11 is secured to the upper end plate 14 which may be, for example, the vehicle frame. A metal retaining ring 15, commonly referred to as a girdle ring, holds the central portion of the spring member 6 in place during the operation of the spring 5.

When the piston member 10 travels within the spring member 6, the piston assembly 9 and the upper retaining element 11 move relative to each other and change the configuration of the spring member 6 by creating a rolling motion in the toroidal loop 8 or so-called rolling lobe portion of the wall of the spring member 6 in the direction of the movement, which is shown in broken lines. The column of air or other fluid contained in the chamber of the spring member 6 is compressed and expanded by the reciprocating action of the piston member 10 and thereby is able to support a load, such as a vehicle body.

The protective member 1 is superposed over and made to snugly fit at least the outer peripheral surface of the piston member 10 that travels within the spring member 6 during the operation of the spring 5. The protective member 1 is retained on the piston 10, for example, by being held securely between the bead 12 of the spring member 6 and the piston member 10 by means of the peripheral holding lip 2. This is most clearly shown in FIG. 4.

Since the protective member 1 is not adhered completely to the outer peripheral surface of the piston member 10, it is free to move or flex during the operation of the spring 5. Consequently, when the piston member 10 travels within the spring member 6 during the compression stroke a rolling motion is caused in the toroidal loop portion 8 of the member 6 and the resulting movement of the spring member 6 over the protective member 1 causes a slight flexing in the protective member 1, which is shown in broken lines in FIG. 4. This movement or flexing acts to deflect and/or flake off harmful abrading debris 16 from the surface of the piston member 10 to eliminate any substantial accumulation of such debris 16. In addition, the protective member 1 also provides a barrier to prevent the migration of such debris 16 along the outer surface of the piston member 10 during the operation of the fluid pressure system.

Figure 5:
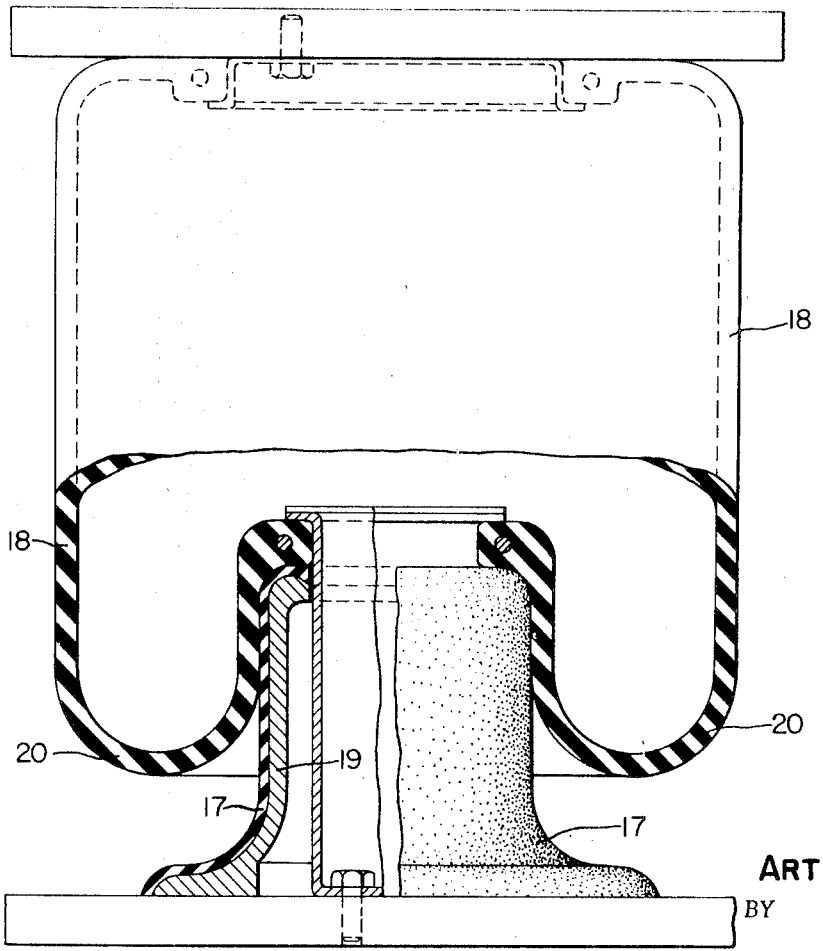
FIG. 5 is a modification of the invention shown in FIG. 3 illustrating another type of spring assembly for which the invention is useful.
Figure 6:
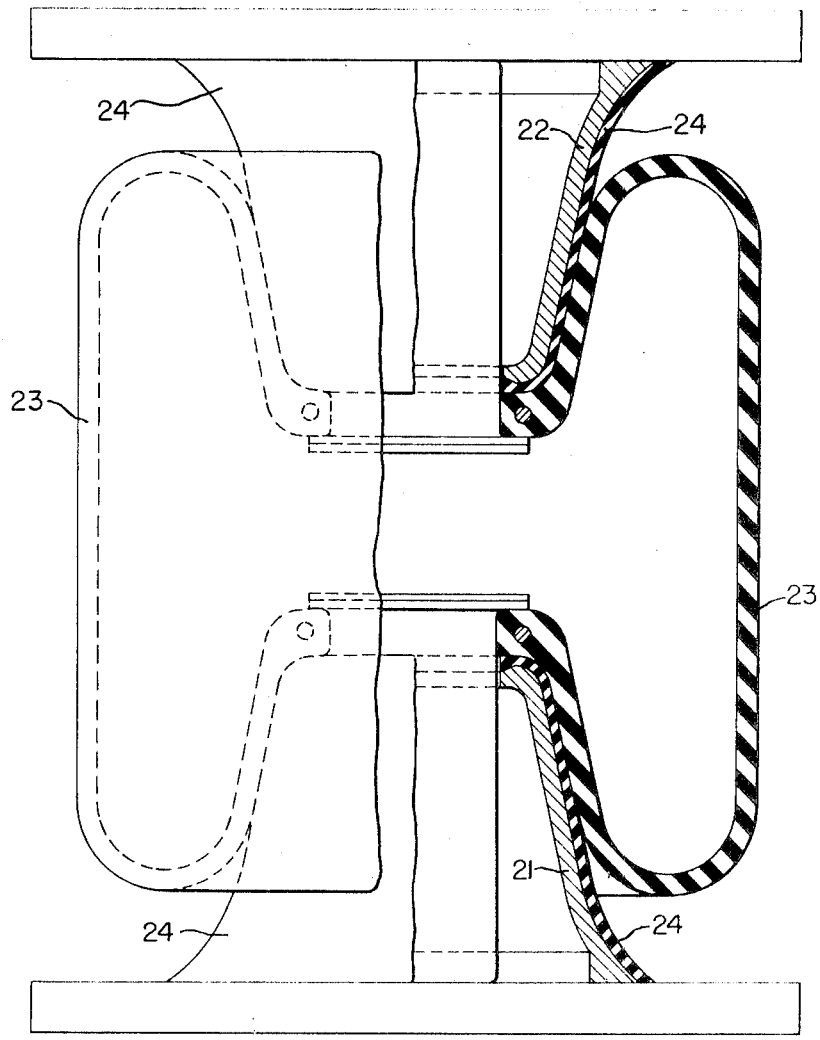
FIG. 6 is a further modification of the invention shown in FIG. 3 illustrating another type of spring assembly for which the invention is useful.

Of course, the protective member of this invention may be used in any number of fluid pressure systems and in conjunction with any size or shape piston with the member produced to assume the particular piston configuration. For instance, as shown in FIG. 5, the protective member 17 may be used in the typical rolling lobe air spring assembly 18 to cover a straight-walled piston member 19. The spring assembly 18 is shown in the normal operating or design position during the operation of the system. In this arrangement the flexible spring member 20 is in the form of a generally cylindrical sleeve. The operation of this type spring is basically identical to that of the combination bellows and rolling lobe air spring as previously described and shown in FIGS. 3 and 4. Also, the protective member may be used in a system as shown in FIG. 6 in which the spaced retaining elements are bell-shaped pistons 21 and 22 which act at opposite ends of the flexible spring member 23 and the protective member 24 may be placed over either or both pistons 21 and 22. This system is also shown in the design position while under compression.

In order that the necessary flexing occurs in the protective member as it comes in contact with the spring member, it is necessary that the thickness or gauge of the protective member be controlled during manufacture. It has been found that a thickness range of from about 0.030 of an inch to about 0.375 of an inch produces the most satisfactory results with a preferred range of from about 0.060 of an inch to about 0.250 of an inch being most appropriate when the protective member is retained in the manner shown in FIGS. 3 and 4. In addition to this means of retention, the member may also for instance be cemented to either the top or bottom of the piston member. When the thickness of the member is in excess of about 0.090 inch the member may be retained on the outer surface of the piston member by being adhered completely thereto in any manner well known in the art. This is true since, because of the added thickness, the member is able to flex sufficiently even though bonded to the surface of the piston.

Preferably, the protective member is in the form of a cap or boot covering substantially the entire outer peripheral surface of the piston member as is shown in FIGS. 3 through 6. In this way road dust and other foreign particles are largely prevented from migrating along the surface of the piston at the point most remote from the spring member thereby decreasing the possibility of eventual entrapment and accumulation which damages the wall of the spring member. However, the protective member will be effective in preventing or substantially reducing the harmful accumulation of abrading debris if placed in other locations on the outer surface of the piston as well. For example, the protective member may only cover the end portion of the piston member that travels with the spring member during the operation of the fluid pressure system.

Figure 7:
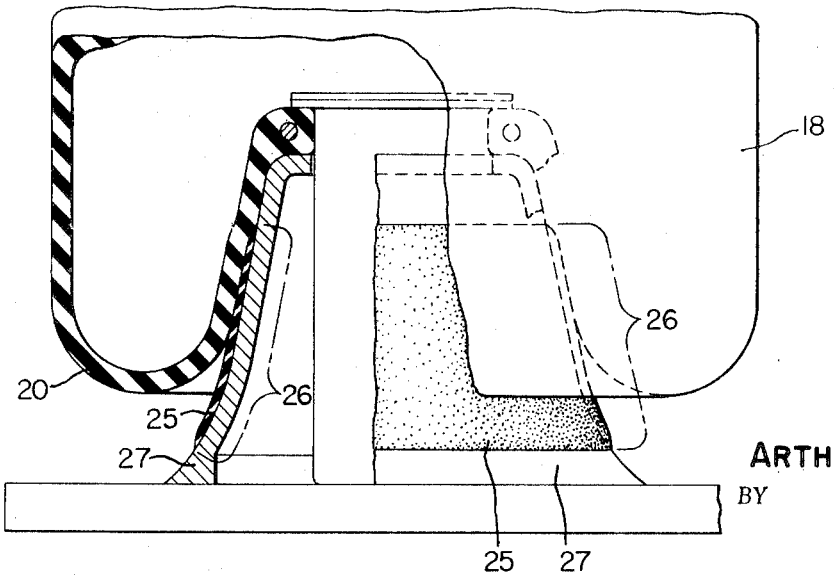
FIG. 7 is another form of the invention shown in FIG. 3 with another modification of the protective member.

In FIG. 7 an alternative form of the invention is shown in which the protective member 25 is in the form of a band of flexible resilient material which covers only the central portion 26 of the outer peripheral surface of the piston member 27. In this arrangement the protective member 25 may be retained on the piston member 27 by bonding if of sufficient thickness as previously discussed or may be retained in some other manner, for instance, by means of fasteners formed on the surface of the protective member during manufacture or by means of a specially constructed piston adapted for receiving the protective member.

The protective members of this invention may be manufactured from any of the well-known polymeric materials, such as of natural rubber, synthetic rubber, and polyvinyl chloride. Preferably, the polymeric material should exhibit high abrasion and tear resistance and should also be of relatively low modulus so that the normal motion or movement of the spring member will cause the protective member to move in relation to the piston. For example, in this regard it has been determined that when a force of from about 5 to about 60 pounds is exerted on a one-inch section of the protective member a displacement or movement therein of from about 10 to about 20 percent should result. The most satisfactory results are attained when a force of from about 10 to about 40 pounds is required to achieve the desired percent displacement. Polyurethane elastomers and polyvinyl chloride are particularly suitable materials for this application.

While certain representative embodiments and details have been shown for the purpose of illustrating the invention, it will be apparent to those skilled in the art that various changes and modifications may be made therein without departing from the spirit or scope of the invention.

What I claim is:

1. A protective member of flexible resilient material superposed over and snugly fitting at least a portion of the outer peripheral surface of a generally cylindrical relatively rigid piston member of a fluid pressure system, such system being of the type in which one of the peripheral end portions of a flexible resilient hollow spring member is attached to the piston member and the other end portion is attached to a spaced retaining element to form a fluidtight chamber capable of supporting a load, the piston member and retaining element being movable with respect to each other to cause a change in the configuration of the spring member and in the pressure of the fluid contained in the chamber, said piston member moving within said spring member to cause a rolling motion therein, said protective member being retained on said piston member in such a manner that when the piston member travels within said spring member to cause the rolling motion therein the resulting movement of said spring member over said protective member causes a slight flexing in said protective member which deflects and/or flakes off harmful abrading debris from the surface of the piston member to eliminate any substantial accumulation of such debris and also provides a barrier to prevent the migration of such debris along the outer surface of said piston member during the operation of the fluid pressure system.

2. The protective member as claimed in claim 1 wherein said protective member covers at least the outer peripheral surface of the end portion of said piston member that travels within said spring member during the operation of the fluid pressure system.

3. The protective member as claimed in claim 1 wherein said protective member covers at least the central portion of the outer peripheral surface of said piston member.

4. The protective member as claimed in claim 1 wherein said protective member covers substantially the entire outer peripheral surface of said piston member.

5. The protective member as claimed in claim 1 wherein the thickness of said protective member is from about 0.030 of an inch to about 0.375 of an inch.

6. The protective member as claimed in claim 1 wherein the thickness of said protective member is from about 0.060 of an inch to about 0.250 of an inch.

7. The protective member as claimed in claim 1 wherein said protective member is retained on the outer peripheral surface of the end portion of said piston member that moves within said spring member during the operation of the fluid pressure system.

8. The protective member as claimed in claim 1 wherein the thickness of said protective member is greater than 0.090 inch and said protective member is adhered to the outer peripheral surface of said piston member.

9. The protective member as claimed in claim 1 wherein the protective member includes a textile fabric reinforcement therein.

10. The protective member as claimed in claim 1 wherein the flexible resilient material is polymeric material of relatively low modulus and is selected from the group consisting of natural rubber, synthetic rubber, and polyvinyl chloride.

11. The protective member as claimed in claim 1 wherein the flexible resilient polymeric material is selected from the group consisting of polyurethane elastomers and polyvinyl chloride.

12. In a fluid pressure system including
A. a flexible resilient hollow spring member;
B. a pair of spaced retaining elements with each being attached to a peripheral end portion of said spring member to form a fluid tight chamber capable of supporting a load with said elements being movable relative to each other to cause a change in the configuration of the spring member and in the pressure of the fluid in the chamber, at least one of said elements being a generally cylindrical relatively rigid piston member which moves within said spring member to cause a rolling motion therein; and
C. the improvement comprising a protective member of flexible resilient material superposed over and snugly fitting at least a portion of the outer peripheral surface of said piston member and retained thereon in such a manner that when the piston member travels within said spring member to cause the rolling motion therein, the resulting movement of said spring member over said protective member causes a slight flexing in said protective member which deflects and/or flakes off harmful abrading debris from the surface of the piston member to eliminate any substantial accumulation of such debris and also provides a barrier to the migration of such debris along the outer surface of said piston during the operation of the fluid pressure system.

13. The system as claimed in claim 12 wherein each said retaining element comprises a generally cylindrical relatively rigid piston member and one said protective member is retained on each said piston member.

14. The protective member as claimed in claim 12 wherein said protective member covers at least the outer peripheral surface of the end portion of said piston member that moves within said spring member during the operation of the fluid pressure system.

15. The protective member as claimed in claim 12 wherein said protective member covers at least the central portion of the outer peripheral surface of said piston member.

16. The protective member as claimed in claim 12 wherein said protective member covers substantially the entire outer peripheral surface of said piston member.

17. The protective member as claimed in claim 12 wherein the thickness of said protective member is from about 0.030 of an inch to about 0.375 of an inch.

18. The protective member as claimed in claim 12 wherein the thickness of said protective member is from about 0.060 of an inch to about 0.250 of an inch.

19. The protective member as claimed in claim 12 wherein said protective member is retained on the outer peripheral surface of the end portion of said piston member that moves within said spring member during the operation of the fluid pressure system.

20. The protective member as claimed in claim 12 wherein the thickness of said protective member is greater than 0.090 of an inch and said protective member is adhered to the outer peripheral surface of said piston member.

21. The protective member as claimed in claim 12 wherein the protective member includes a textile fabric reinforcement therein.

22. The protective member as claimed in claim 12 wherein the flexible resilient material is polymeric material of relatively low modulus and selected from the group consisting of natural rubber, synthetic rubber, and polyvinyl chloride.

23. The protective member as claimed in claim 12 wherein the flexible resilient polymeric material is selected from the group consisting of polyurethane elastomers and polyvinyl chloride.